(12) United States Patent
Topolkaraev et al.

(10) Patent No.: US 10,815,374 B2
(45) Date of Patent: *Oct. 27, 2020

(54) RENEWABLE POLYESTER FILM HAVING A LOW MODULUS AND HIGH TENSILE ELONGATION

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Neil T. Scholl, Neenah, WI (US); Thomas A. Eby, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,344

(22) Filed: Feb. 10, 2015

(65) Prior Publication Data

US 2015/0159012 A1    Jun. 11, 2015

Related U.S. Application Data

(63) Continuation of application No. 13/370,900, filed on Feb. 10, 2012, now Pat. No. 8,980,964.

(51) Int. Cl.
*C08L 67/04* (2006.01)
*B32B 27/12* (2006.01)
(Continued)

(52) U.S. Cl.
CPC .............. *C08L 67/04* (2013.01); *B32B 27/12* (2013.01); *B32B 27/32* (2013.01); *B32B 27/36* (2013.01);
(Continued)

(58) Field of Classification Search
CPC ...... C08L 67/04; C08L 23/0869; C08L 33/06; C08L 37/00; C08L 2203/16;
(Continued)

(56) References Cited

U.S. PATENT DOCUMENTS 3,338,992 A    8/1967 Kinney
3,341,394 A    9/1967 Kinney
(Continued)

FOREIGN PATENT DOCUMENTS

EP        1054085 A1    11/2000
EP        1579048 B1     7/2001
(Continued)

OTHER PUBLICATIONS

Data for Poly(lactic acid), PLA, and polypropylene (PP) from Handbook of Polymers by George Wypych (pp. 436-440 and pp. 479-485). 2012.*

(Continued)

*Primary Examiner* — Kara B Boyle
(74) *Attorney, Agent, or Firm* — Dority & Manning, P.A.

(57) ABSTRACT

A film that is formed from a thermoplastic composition is provided. The thermoplastic composition contains a rigid renewable polyester and a polymeric toughening additive. The toughening additive can be dispersed as discrete physical domains within a continuous matrix of the renewable polyester. An increase in deformation force and elongational strain causes debonding to occur in the renewable polyester matrix at those areas located adjacent to the discrete domains. This can result in the formation of a plurality of voids adjacent to the discrete domains that can help to dissipate energy under load and increase tensile elongation. To even further increase the ability of the film to dissipate energy in this manner, the present inventors have discovered that an interphase modifier may be employed that reduces (Continued)

the degree of friction between the toughening additive and renewable polyester and thus reduces the stiffness (tensile modulus) of the film.

30 Claims, 2 Drawing Sheets

(51) Int. Cl.
    *B32B 27/36*    (2006.01)
    *B32B 27/32*    (2006.01)
    *C08J 5/18*    (2006.01)
    *C08L 33/06*    (2006.01)
    *C08L 37/00*    (2006.01)
    *C08L 23/08*    (2006.01)
    *C08J 9/00*    (2006.01)
    *C08J 9/28*    (2006.01)

(52) U.S. Cl.
    CPC .............. *C08J 5/18* (2013.01); *C08J 9/0061* (2013.01); *C08L 23/0869* (2013.01); *C08L 33/06* (2013.01); *C08L 37/00* (2013.01); *B32B 2270/00* (2013.01); *B32B 2555/02* (2013.01); *C08J 9/28* (2013.01); *C08J 2363/00* (2013.01); *C08J 2367/04* (2013.01); *C08L 2203/16* (2013.01); *C08L 2205/03* (2013.01); *Y10T 428/31786* (2015.04); *Y10T 442/674* (2015.04); *Y10T 442/675* (2015.04)

(58) Field of Classification Search
    CPC ..... C08L 2205/03; B32B 27/32; B32B 27/12; B32B 27/36; B32B 2270/00; B32B 2555/02; C08J 5/18; C08J 9/0061; C08J 9/28; C08J 2363/00; C08J 2367/04; Y10T 442/675; Y10T 428/31786; Y10T 442/674
    See application file for complete search history.

(56) References Cited

U.S. PATENT DOCUMENTS

| | | |
|---|---|---|
| 3,650,649 A | 3/1972 | Schippers |
| 3,692,618 A | 9/1972 | Dorschner et al. |
| 3,726,955 A | 4/1973 | Hughes et al. |
| 4,055,702 A | 10/1977 | Guthrie et al. |
| 4,707,398 A | 11/1987 | Boggs |
| 4,797,468 A | 1/1989 | De Vries |
| 4,937,299 A | 6/1990 | Ewen et al. |
| 5,057,368 A | 10/1991 | Largman et al. |
| 5,069,970 A | 12/1991 | Largman et al. |
| 5,084,334 A | 1/1992 | Hamano et al. |
| 5,108,820 A | 4/1992 | Kaneko et al. |
| 5,162,074 A | 11/1992 | Hills |
| 5,218,071 A | 6/1993 | Tsutsui et al. |
| 5,266,610 A | 11/1993 | Malhotra et al. |
| 5,272,236 A | 12/1993 | Lai et al. |
| 5,277,976 A | 1/1994 | Hogle et al. |
| 5,278,272 A | 1/1994 | Lai et al. |
| 5,317,059 A | 5/1994 | Chundury et al. |
| 5,322,728 A | 6/1994 | Davey et al. |
| 5,336,552 A | 8/1994 | Strack et al. |
| 5,382,400 A | 1/1995 | Pike et al. |
| 5,466,410 A | 11/1995 | Hills |
| 5,470,944 A | 11/1995 | Bonsignore |
| 5,472,775 A | 12/1995 | Obijeski et al. |
| 5,502,158 A | 3/1996 | Sinclair et al. |
| 5,539,056 A | 7/1996 | Yang et al. |
| 5,571,619 A | 11/1996 | McAlpin et al. |
| 5,596,052 A | 1/1997 | Resconi et al. |
| 5,686,531 A | 11/1997 | Engelke et al. |
| 5,714,573 A | 2/1998 | Randall et al. |
| 5,726,220 A | 3/1998 | Tokushige et al. |
| 5,770,682 A | 6/1998 | Ohara et al. |
| 5,807,490 A | 9/1998 | Davis et al. |
| 5,821,327 A | 10/1998 | Oota et al. |
| 5,844,067 A | 12/1998 | Erneta |
| 5,880,254 A | 3/1999 | Ohara et al. |
| 5,883,199 A | 3/1999 | McCarthy et al. |
| 5,939,467 A | 8/1999 | Wnuk et al. |
| 6,117,928 A | 9/2000 | Hiltunen et al. |
| 6,153,138 A | 11/2000 | Helms, Jr. et al. |
| 6,200,669 B1 | 3/2001 | Marmon et al. |
| 6,235,825 B1 | 5/2001 | Yoshida et al. |
| 6,291,597 B1 | 9/2001 | Gruber et al. |
| 6,309,988 B1 | 10/2001 | Tsai et al. |
| 6,326,458 B1 | 12/2001 | Gruber et al. |
| 6,372,846 B1 | 4/2002 | McGrail et al. |
| 6,500,563 B1 | 12/2002 | Datta et al. |
| 6,509,092 B1 | 1/2003 | Dugan |
| 6,660,211 B2 | 12/2003 | Topolkaraev et al. |
| 6,713,175 B1 | 3/2004 | Terada et al. |
| 6,756,331 B2 | 6/2004 | Kasemura et al. |
| 6,811,874 B2 | 11/2004 | Tanaka et al. |
| 6,838,403 B2 | 1/2005 | Tsai et al. |
| 6,869,985 B2 | 3/2005 | Mohanty et al. |
| 6,905,759 B2 | 6/2005 | Topolkaraev et al. |
| 6,914,018 B1 | 7/2005 | Uitenbroek et al. |
| 6,949,288 B2 | 9/2005 | Hodge et al. |
| 7,135,523 B2 | 11/2006 | Ho et al. |
| 7,157,032 B2 | 1/2007 | Eloo |
| 7,256,223 B2 | 8/2007 | Mohanty et al. |
| 7,273,894 B2 | 9/2007 | Shelby et al. |
| 7,354,973 B2 | 4/2008 | Flexman |
| 7,368,503 B2 | 5/2008 | Hale |
| 7,393,590 B2 | 7/2008 | Scheer et al. |
| 7,514,503 B2 | 4/2009 | Nakamichi et al. |
| 7,566,753 B2 | 7/2009 | Randall et al. |
| 7,619,132 B2 | 11/2009 | Topolkaraev et al. |
| 7,872,056 B2 | 1/2011 | Cheung et al. |
| 7,977,397 B2 | 7/2011 | Cheung et al. |
| 7,989,062 B2 | 8/2011 | Chakravarty et al. |
| 7,994,078 B2 | 8/2011 | Reichmann et al. |
| 8,022,139 B2 | 9/2011 | Kurihara et al. |
| 8,026,309 B2 | 9/2011 | Halahmi et al. |
| 8,030,382 B2 | 10/2011 | Endo et al. |
| 8,044,134 B2 | 10/2011 | Chung et al. |
| 8,075,994 B2 | 12/2011 | Sakamoto et al. |
| 8,076,406 B2 | 12/2011 | Brule et al. |
| 8,188,188 B2 | 5/2012 | Kobayashi et al. |
| 8,236,893 B2 | 8/2012 | Nakagawa et al. |
| 8,268,738 B2 | 9/2012 | McEneany et al. |
| 8,268,913 B2 | 9/2012 | Li et al. |
| 8,287,677 B2 | 10/2012 | Lake et al. |
| 8,334,327 B2 | 12/2012 | Kaufman et al. |
| 8,334,348 B2 | 12/2012 | Hogt et al. |
| 8,362,145 B2 | 1/2013 | Li et al. |
| 8,372,917 B2 | 2/2013 | Li et al. |
| 8,410,215 B2 | 4/2013 | Sano et al. |
| 8,415,008 B2 | 4/2013 | Ito et al. |
| 8,420,193 B2 | 4/2013 | Hiruma et al. |
| 8,444,905 B2 | 5/2013 | Li et al. |
| 8,466,337 B2 | 6/2013 | Wang et al. |
| 8,637,130 B2 | 1/2014 | Wang et al. |
| 8,709,591 B2 | 4/2014 | Sumi et al. |
| 2003/0039775 A1 | 2/2003 | Kong |
| 2003/0105231 A1 | 6/2003 | Miller |
| 2003/0153684 A1 | 8/2003 | Miller |
| 2003/0162013 A1 | 8/2003 | Topolkaraev et al. |
| 2005/0112363 A1 | 5/2005 | Ning |
| 2005/0119359 A1* | 6/2005 | Shelby .................. B32B 27/08 521/50 |
| 2007/0182041 A1 | 8/2007 | Rizk et al. |
| 2008/0042312 A1 | 2/2008 | Chen et al. |
| 2008/0147165 A1 | 6/2008 | Hossainy et al. |
| 2008/0287026 A1 | 11/2008 | Chakravarty et al. |
| 2008/0311814 A1 | 12/2008 | O'Sickey et al. |
| 2009/0060860 A1 | 3/2009 | Almenar et al. |
| 2009/0068463 A1 | 3/2009 | Mochizuki et al. |
| 2009/0069463 A1 | 3/2009 | Serizawa et al. |
| 2009/0124956 A1 | 5/2009 | Swetlin et al. |
| 2009/0274871 A1* | 11/2009 | Takahashi .................. C08J 5/18 428/141 |

(56) References Cited

U.S. PATENT DOCUMENTS

| | | |
|---|---|---|
| 2009/0311937 A1 | 12/2009 | He et al. |
| 2009/0324911 A1 | 12/2009 | Li et al. |
| 2009/0326152 A1 | 12/2009 | Li et al. |
| 2010/0048082 A1 | 2/2010 | Topolkaraev et al. |
| 2010/0056656 A1 | 3/2010 | Matsuoka et al. |
| 2010/0112357 A1 | 5/2010 | Fine et al. |
| 2011/0028062 A1 | 2/2011 | Chester et al. |
| 2011/0046281 A1 | 2/2011 | Scheer et al. |
| 2011/0071238 A1 | 3/2011 | Bastioli et al. |
| 2011/0132519 A1 | 6/2011 | Li et al. |
| 2011/0144273 A1 | 6/2011 | Li et al. |
| 2011/0178196 A1 | 7/2011 | Steinke et al. |
| 2011/0190447 A1 | 8/2011 | Li et al. |
| 2011/0195210 A1 | 8/2011 | Li et al. |
| 2011/0245420 A1 | 10/2011 | Rasal et al. |
| 2011/0251346 A1 | 10/2011 | Li et al. |
| 2012/0040185 A1 | 2/2012 | Topolkaraev et al. |
| 2012/0040582 A1 | 2/2012 | Topolkaraev et al. |
| 2012/0164905 A1 | 6/2012 | Topolkaraev et al. |
| 2012/0211927 A1 | 8/2012 | Li et al. |
| 2012/0214944 A1 | 8/2012 | Li et al. |
| 2012/0232191 A1* | 9/2012 | Auffermann ............... C08J 5/18 524/5 |
| 2013/0210308 A1 | 8/2013 | McEneany et al. |
| 2013/0210621 A1 | 8/2013 | Topolkaraev et al. |
| 2013/0210949 A1 | 8/2013 | Scholl et al. |
| 2013/0210983 A1 | 8/2013 | Topolkaraev et al. |

FOREIGN PATENT DOCUMENTS

| | | |
|---|---|---|
| EP | 1361039 A1 | 11/2003 |
| EP | 1725614 B1 | 8/2008 |
| GB | 1385105 | 2/1975 |
| JP | 2008285621 | 11/2008 |
| WO | WO 9853141 A1 | 11/1998 |
| WO | WO 01/14621 A1 | 3/2001 |
| WO | WO 0134886 A1 | 5/2001 |
| WO | WO 02/085969 A2 | 10/2002 |
| WO | WO 03049589 A1 | 6/2003 |
| WO | WO 03066704 A1 | 8/2003 |
| WO | WO 2007092417 A1 | 8/2007 |
| WO | WO 2007115081 A2 | 10/2007 |
| WO | WO 2007115081 A3 | 10/2007 |
| WO | WO 2008020726 A1 | 2/2008 |
| WO | WO 2008030599 A2 | 3/2008 |
| WO | WO 2008030599 A3 | 3/2008 |
| WO | WO 2008079784 A2 | 7/2008 |
| WO | WO 2008079784 A3 | 7/2008 |
| WO | WO 2008130226 A2 | 10/2008 |
| WO | WO 2008130226 A3 | 10/2008 |
| WO | WO 2009/012284 A1 | 1/2009 |
| WO | WO 2009145778 A1 | 12/2009 |
| WO | WO 2009151437 A1 | 12/2009 |
| WO | WO 2009151439 A1 | 12/2009 |
| WO | WO 2010002669 A1 | 1/2010 |
| WO | WO 2011054786 A1 * | 5/2011 ............... C08J 5/18 |
| WO | WO 2011/084670 A1 | 7/2011 |
| WO | WO 2011080623 A2 | 7/2011 |
| WO | WO 2011080623 A3 | 7/2011 |
| WO | WO 2012020336 A2 | 2/2012 |
| WO | WO 2012020336 A3 | 2/2012 |

OTHER PUBLICATIONS

Tomsic, Dictionary of Materials and Testing, Second Edition, Society of Automotive Engineers, p. 311 (Year: 2000).*
Definition of Pore. Merriam-Webster Online Dictionary. (Year: 2018).*
Definition of Pore. Dictionary.com. (Year: 2018).*
Definition of Void. Merriam-Webster online dictionary. (Year: 2018).*
Definition of Adjacent. Dictionary.com (Year: 2018).*
Extended European Search Report and Written Opinion, referencing PCT/IB2013050733 , dated Sep. 4, 2015, 10 pages.
Abstract of Japanese Patent—JP2007161825, dated Jun. 28, 2007, 2 pages.
Abstract of Japanese Patent—JP2010260921 dated Dec. 16, 2010, 1 page.
Machine Translation of JPH09059498, dated Mar. 4, 1997.
Machine Translation of JP2005-088600, dated Apr. 7, 2005.
Machine Translation of JP2007-270076, dated Oct. 18, 2007.
Machine Translation of JP2009-197099, dated Sep. 3, 2009.
Machine Translation of JP2010-001369, dated Jan. 7, 2010.
Machine Translation of JP2010-046852, dated Mar. 4, 2010.
Abstract of Korean Patent—KR20080072740, dated Aug. 6, 2008, 1 page.
Abstract of Korean Patent—KR20090024709, dated Mar. 9, 2009, 1 page.
Abstract of Korean Patent—KR20090034199, dated Apr. 7, 2009, 1 page.
Abstract of Article—Balakrishnan et al., "Mechanical, Thermal, and Morphological Properties of Polylactic Acid/Linear Low Density Polyethylene Blends," *Journal of Elastomers and Plastics*, vol. 42, No. 3, May 2010, pp. 223-239.
Article—Balakrishnan et al., "Novel toughened polylactic acid nanocomposite: Mechanical, thermal and morphological properties," *Materials and Design*, vol. 31, 2010, pp. 3289-3298.
Article—Chalamet et al., "Carboxyl Terminated Polyamide 12 Chain Extension by Reactive Extrusion Using a Dioxazoline Coupling Agent. Part I: ExtrusionParameters Anaylsis," *Polymer Engineering and Science*, vol. 40, No. 1, Jan. 2000, pp. 263-274.
Article—Chalamet et al., "Carboxyl Terminated Polyamide 12 Chain Extension by Reactive Extrusion Using a Dioxazoline Coupling Agent. Part II: Effects of Extrusion Conditions," *Polymer Engineering and Science*, vol. 40, No. 12, Dec. 2002, pp. 2317-2327.
Article—Gramlich et al., "Reactive Compatibilization of Poly(L-lactide) and Conjugated Soybean Oil, " *Macromolecules*, vol. 43, No. 5, 2010, pp. 2313-2321.
Article—Japon et al., "Reactive processing of poly(ethylene terephthalate) modified with multifunctional epoxy-based additives," *Polymer*, vol. 41, 2000, pp. 5809-5818.
Article—Jing et al., "A Bifunctional Monomer Derived from Lactide for Toughening Polylactide," *J. Am. Chem. Soc.*, vol. 130, No. 42, 2008, pp. 13826-13867.
Article—Hideko T. Oyama, "Super-tough poly(lactic acid) materials: Reactive blending with ethylene copolymer," *Polymer*, vol. 50, 2009, pp. 747-751.
Article—Robertson et al., "Toughening of Polylactide with Polymerized Soybean Oil," *Macromolecules*, vol. 43, 2010, pp. 1807-1814.
Article—Sun et al., "Toughening of poly(butylene terephthalate) with epoxy-functionalized acrylonitrile-butadiene-styrene," *Polymer*, vol. 43, 2005, pp. 7632-7643.
Article—Xanthos et al., "Reactive Modification of Polyethylene Terephthalate With Polyepoxides," *Polymer Engineering and Science*, vol. 41, No. 4, Apr. 2001, pp. 643-655.
Article—Zhang et al., "Preparation and properties of biodegradable poly(lactic acid)/poly(butylene adipate-co-terephthalate) blend with glycidyl methyacrylate as reactive processing agent," *J. Mater. Sci.*, vol. 44, 2009, pp. 250-256.
Part of Book—Biopolymers, vol. 4, Polyester III, Applications and Commercial Products, Edited by Y. Doi and A. Steinbüchel—Polylactides by Prof. Dr. Hideto Tsuji, 2002, pp. 129-177.
Part of Book—Handbook of Plasticizers, $2^{nd}$ Edition, 2004, 2012—Theories of Compatability by Yu et al.
Part of Book—Handbook of Polymers—Data for Polyethylene Terephthalate (PET), by George Wypych , 2012. pp. 436-440, 479-485, and 385-390.
Part of Book—Handbook of Polymers—Poly(lactic acid) (PLA) and Polyprophylene, by George Wypych , 2012, pp. 436-440, 479-485.
Technology Focus Report: Blends of PLA with Other Thermoplastics from NatureWorks®, Feb. 7, 2007, 6 pages.
Technology Focus Report : Toughened PLA from NatureWorks®, Mar. 1, 2007, 5 pages.

(56) References Cited

OTHER PUBLICATIONS

Product information—PLA Processing Guide for Spinning Fibers from NatureWorks®, Mar. 15, 2005, 14 pages.
Product Information—NatureWorks® PLA Polymer 6201D—Fiber Melt Spinning from NatureWorks®, 2005, 3 pages.
Product Information on Lotader® AX8950, 2004, 2 pages.
Product Information—Lotader® Applications—Impact modifier for engineer plastics, Jan. 3, 2012, 1 page.
Search Report and Written Opinion for PCT/IB2013/050733 dated Jul. 18, 2013, 11 pages.
Machine Translation of JP2007-002211A dated Jan. 11, 2007, 12 pages.
Machine Translation of JP2007-270076A dated Oct. 18, 2007, 7 pages.
Machine Translation of JPH09-2911203A dated Nov. 11, 1997, 3 pages.
Ashok Narladkar, et al., "Difference in Glass Transition Behavior Between Semi Crystalline and Amorphous poly(lactic acid) Thin Films," Macromolecular Symposia, vol. 273, Issue 1, Nov. 2008, 3 pages.
David E. Henton, et al., "Polyactic Acid Technology," Natural Fibers, Biopolymers, and Biocomposites, Feb. 11, 2005, 52 pages.

\* cited by examiner

RENEWABLE POLYESTER FILM HAVING A LOW MODULUS AND HIGH TENSILE ELONGATION

RELATED APPLICATIONS

The present application is a continuation of U.S. application Ser. No. 13/370,900 having a filing date of Feb. 10, 2012, the entire contents of which is incorporated herein by reference.

BACKGROUND OF THE INVENTION

Films are used in a wide variety of applications, including as package items (e.g., food) and in personal care absorbent articles (e.g., diapers, feminine care articles, etc.). One problem associated with many conventional films is that they are often formed from a synthetic polymer (e.g., LLDPE) that is not renewable. Unfortunately, the use of renewable polymers in such films is problematic due to the difficulty involved with thermally processing such polymers. Renewable polyesters, for example, have a relatively high glass transition temperature and typically demonstrate a very high stiffness and tensile modulus, while having low ductility/elongations at break. As an example, polylactic acid has a glass transition temperature of about 59° C. and a tensile modulus of about 2 GPa or more. Nevertheless, the tensile elongation (at break) for PLA materials is only about 5%. Such a high modulus and low elongation significantly limits the use of such polymers in films, where a good balance between material stiffness and elongation is required. In addition to these problems, polylactic acid, for example, is also too rigid for quiet flexible film applications and tends to have performance issues during use, such as causing noisy rustles for adult feminine products.

As such, a need currently exists for a film that is formed from a renewable polyester and yet is still capable of exhibiting a relatively low modulus and high tensile elongation.

SUMMARY OF THE INVENTION

In accordance with one embodiment of the present invention, a film is disclosed that comprises a thermoplastic composition. The thermoplastic composition comprises at least one rigid renewable polyester having a glass transition temperature of about 0° C. or more, from about 1 wt. % to about 30 wt. % of at least one polymeric toughening additive based on the weight of the renewable polyester, and from about 0.1 wt. % to about 20 wt. % of at least one interphase modifier based on the weight of the renewable polyester. The thermoplastic composition has a morphology in which a plurality of discrete primary domains are dispersed within a continuous phase, the domains containing the polymeric toughening additive and the continuous phase containing the renewable polyester. The film also exhibits a tensile modulus in the machine direction and cross-machine direction of about 2500 Megapascals or less, a tensile elongation at break in the machine direction of about 10% or more, and a tensile elongation at break in the cross-machine direction of about 15% or more, wherein the tensile modulus and tensile elongation at break are determined at 23° C. according to ASTM D638-10. Further, the ratio of the glass transition temperature of the thermoplastic composition to the glass transition temperature of the renewable polyester is from about 0.7 to about 1.3.

In accordance with another embodiment of the present invention, a film is disclosed that has a thickness of from about 1 to about 200 micrometers and comprises a thermoplastic composition. The thermoplastic composition comprises about 70 wt. % or more of at least one polylactic acid having a glass transition temperature of about 0° C. or more, from about 0.1 wt. % to about 30 wt. % of at least one polymeric toughening additive, and from about 0.1 wt. % to about 20 wt. % of at least one interphase modifier. The film exhibits a tensile modulus in the machine direction and cross-machine direction of about 2500 Megapascals or less, a tensile elongation at break in the machine direction of about 10% or more, and a tensile elongation at break in the cross-machine direction of about 15% or more, wherein the tensile modulus and tensile elongation at break are determined at 23° C. according to ASTM D638-10.

In accordance with yet another embodiment of the present invention, an absorbent article is disclosed that comprises a generally liquid-impermeable layer that comprises a film, such as described herein.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
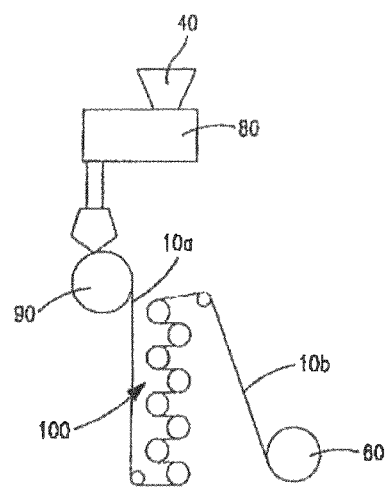
FIG. 1 is a schematic illustration of one embodiment of a method for forming the film of the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a film that is formed from a thermoplastic composition. The thermoplastic composition contains a rigid renewable polyester and a polymeric toughening additive. The present inventors have discovered that the specific nature of the components may be carefully controlled to achieve a composition having desirable morphological features. More particularly, the toughening additive can be dispersed as discrete physical domains within a continuous matrix of the renewable polyester. During the initial application of an external force at low elongational strain, the composition can behave as a monolithic material that exhibits high rigidity and tensile modulus. However, an increase in the deformation force and elongational strain causes debonding to occur in the renewable polyester matrix at those areas located adjacent to the discrete domains. This can result in the formation of a plurality of voids adjacent to the discrete domains that can help to dissipate energy under load and increase tensile elongation. To even further increase the ability of the film to dissipate energy in this manner, the present inventors have discovered that an interphase modifier may be employed that reduces the degree of connectivity and friction between the toughening additive and renewable polyester and thus reduces the stiffness (tensile modulus) of the film. The reduced connectivity and friction between the polymers also enhances the degree and uniformity of debonding, which can help distribute the resulting voids in a substantially homogeneous fashion throughout the composition. For example, the voids may be distributed in columns that are oriented in a direction generally perpendicular to the direction in which a stress is applied. Without intending to be limited by theory, it is believed that the presence of such a homogeneously distributed void system can result in a significant energy dissipation under load and thus a significantly enhanced elongation.

Various embodiments of the present invention will now be described in more detail.

I. Thermoplastic Composition

A. Renewable Polyester

Renewable polyesters typically constitute from about 70 wt. % to about 99 wt. %, in some embodiments from about 75 wt. % to about 98 wt. %, and in some embodiments, from about 80 wt. % to about 95 wt. % of the thermoplastic composition. Any of a variety of renewable polyesters may generally be employed in the thermoplastic composition, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV) poly-3-hydroxybutyrate-co-4-hydroybutyrate, poly-3-hydroxybutyrate-co-3-hydroxyvalerate copolymers (PHBV) poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

Typically, the thermoplastic composition contains at least one renewable polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The renewable polyester may also have a melting temperature of from about 140° C. to about 260° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

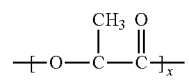

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the renewable polyester have a moisture content of about 300 parts per million ("ppm") or less, in some embodiments about 200 ppm or less, in some embodiments from about 1 to about 100 ppm prior to blending with the toughening additive. Drying of the polyester may occur, for instance, at a temperature of from about 50° C. to about 100° C., and in some embodiments, from about 70° C. to about 80° C.

B. Polymeric Toughening Additive

As indicated above, the thermoplastic composition of the present invention also contains a polymeric toughening additive. Due to its polymeric nature, the toughening additive possesses a relatively high molecular weight that can help improve the melt strength and stability of the thermoplastic composition. Although not required, the polymeric toughening additive may be generally immiscible with the renewable polyester. In this manner, the toughening additive can better become dispersed as discrete phase domains within a continuous phase of the renewable polyester. The discrete domains are capable of absorbing energy that arises from an external force, which increases the overall toughness and strength of the resulting material. The domains may have a variety of different shapes, such as elliptical, spherical, cylindrical, etc. In one embodiment, for example, the domains have a substantially elliptical shape. The physical dimension of an individual domain is typically small enough to minimize the propagation of cracks through the polymer material upon the application of an external stress, but large enough to initiate microscopic plastic deformation and allow for shear zones at and around particle inclusions.

While the polymers may be immiscible, the toughening additive may nevertheless be selected to have a solubility parameter that is relatively similar to that of the renewable polyester. This can improve the interfacial compatibility and physical interaction of the boundaries of the discrete and continuous phases, and thus reduces the likelihood that the composition will fracture. In this regard, the ratio of the solubility parameter for the renewable polyester to that of the toughening additive is typically from about 0.5 to about 1.5, and in some embodiments, from about 0.8 to about 1.2.

For example, the polymeric toughening additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{(\Delta H_v - RT)/V_m}$$

where:
$\Delta H_v$=heat of vaporization
R=Ideal Gas constant
T=Temperature
$V_m$=Molecular Volume The Hildebrand solubility parameters for many polymers are also available from the Solubility Handbook of Plastics, by Wyeych (2004), which is incorporated herein by reference.

The polymeric toughening additive may also have a certain melt flow rate (or viscosity) to ensure that the discrete domains and resulting voids can be adequately maintained. For example, if the melt flow rate of the toughening additive is too high, it tends to flow and disperse uncontrollably through the continuous phase. This results in lamellar or plate-like domains that are difficult to maintain and also likely to prematurely fracture. Conversely, if the melt flow rate of the toughening additive is too low, it tends to clump together and form very large elliptical domains, which are difficult to disperse during blending. This may cause uneven distribution of the toughening additive through the entirety of the continuous phase. In this regard, the present inventors have discovered that the ratio of the melt flow rate of the toughening additive to the melt flow rate of the renewable polyester is typically from about 0.2 to about 8, in some embodiments from about 0.5 to about 6, and in some embodiments, from about 1 to about 5. The polymeric toughening additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the polymeric toughening additive may also be selected to achieve the desired increase in toughness. For example, when a blend of the renewable polyester and toughening additive is applied with an external force, shear and/or plastic yielding zones may be initiated at and around the discrete phase domains as a result of stress concentrations that arise from a difference in the elastic modulus of the toughening additive and renewable polyester. Larger stress concentrations promote more intensive localized plastic flow at the domains, which allows them to become significantly elongated when stresses are imparted. These elongated domains allow the composition to exhibit a more pliable and softer behavior than the otherwise rigid polyester resin. To enhance the stress concentrations, the toughening additive is selected to have a relatively low Young's modulus of elasticity in comparison to the renewable polyester. For example, the ratio of the modulus of elasticity of the renewable polyester to that of the toughening additive is typically from about 1 to about 250, in some embodiments from about 2 to about 100, and in some embodiments, from about 2 to about 50. The modulus of elasticity of the toughening additive may, for instance, range from about 2 to about 500 Megapascals (MPa), in some embodiments from about 5 to about 300 MPa, and in some embodiments, from about 10 to about 200 MPa. To the contrary, the modulus of elasticity of polylactic acid is typically from about 800 MPa to about 2000 MPa.

To impart the desired increase in toughness, the polymeric toughening additive may also exhibit an elongation at break (i.e., the percent elongation of the polymer at its yield point) greater than the renewable polyester. For example, the polymeric toughening additive of the present invention may exhibit an elongation at break of about 50% or more, in some embodiments about 100% or more, in some embodiments from about 100% to about 2000%, and in some embodiments, from about 250% to about 1500%.

While a wide variety of polymeric additives may be employed that have the properties identified above, particularly suitable examples of such polymers may include, for instance, polyolefins (e.g., polyethylene, polypropylene, polybutylene, etc.); styrenic copolymers (e.g., e.g., styrene-butadiene-styrene, styrene-Isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.; polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %; in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen at al.; U.S. Pat. No. 5,218,071 to Tsutsui et al.; U.S. Pat. No. 5,272,236 to Lai, at al.; and U.S. Pat. No. 5,278,272 to Lai, at al., which are incorporated herein in their entirety by reference thereto for all purposes. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, at al.; U.S. Pat. No. 5,539,056 to Yang, et al.; and U.S. Pat. No. 5,596,052 to Resconi et al., which are incorporated herein in their entirety by reference thereto for all purposes.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai at and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride; bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the polymeric toughening additive in the thermoplastic composition is selected to achieve the desired properties without significantly impacting the renewability of the resulting composition. For example, the toughening additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the renewable polyesters employed in the composition. The concentration of the toughening additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Interphase Modifier

An interphase modifier is also employed in the thermoplastic composition to alter the interaction between the toughening additive and the renewable polyester matrix. The modifier is generally in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the polymer toughening additive, resulting in a change in the interfacial tension between the renewable polyester and the toughening additive. By reducing physical forces at the interfaces between the polyester and the toughening additive, it is believed that the low viscosity, hydrophobic nature of the modifier can help facilitate debonding from the polyester matrix upon the application of an external force. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, etc. One particularly suitable interphase modifier is polyether polyol, such as commercially available under the trade name PLURIOL® WI from BASF Corp. Another suitable modifier is a partially renewable ester, such as commercially available under the trade name HALLGREEN® IM from Hallstar.

Although the actual amount may vary, the interphase modifier is typically employed in an amount of from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the renewable polyesters employed in the composition. The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial renewable polyester. In this regard, the ratio of the glass temperature of the composition to that of the polyester is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the renewable polyester. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

D. Compatibilizer

As indicated above, the polymeric toughening additive is generally selected so that it has a solubility parameter relatively close to that of the renewable polyester. Among other things, this can enhance the compatibility of the phases and improve the overall distribution of the discrete domains within the continuous phase. Nevertheless, in certain embodiments, a compatibilizer may optionally be employed to further enhance the compatibility between the renewable polyester and the polymeric toughening additive. This may be particularly desirable when the polymeric toughening additive possesses a polar moiety, such as polyurethanes, acrylic resins, etc. When employed, the compatibilizers typically constitute from about 0.5 wt. % to about 20 wt. %, in some embodiments from about 1 wt. % to about 15 wt. %, and in some embodiments, from about 1.5 wt. % to about 10 wt. % of the thermoplastic composition. One example of a suitable compatibilizer is a functionalized polyolefin. The polar component may, for example, be provided by one or more functional groups and the non-polar component may be provided by an olefin. The olefin component of the compatibilizer may generally be formed from any linear or branched α-olefin monomer, oligomer, or polymer (including copolymers) derived from an olefin monomer, such as described above.

The functional group of the compatibilizer may be any group that provides a polar segment to the molecule. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the compatibilizer may also be reactive. One example of such a reactive compatibilizer is a polyepoxide modifier that contains, on average, at least two oxirane rings per molecule. Without intending to be limited by theory, it is believed that such polyepoxide molecules can induce reaction of the renewable polyester under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of the renewable polyester (esterification) or via a hydroxyl group (etherification). Oxazoline side reactions may likewise occur to form esteramide moieties. Through such reactions, the molecular weight of the renewable polyester may be increased to counteract the degradation often observed during melt processing. While it is desirable to induce a reaction with the renewable polyester as described above, the present inventors have discovered that too much of a reaction can lead to crosslinking between polyester backbones. If such crosslinking is allowed to proceed to a significant extent, the resulting polymer blend can become brittle and difficult to form into a film with the desired modulus and elongation properties.

In this regard, the present inventors have discovered that polyepoxide modifiers having a relatively low epoxy functionality are particularly effective, which may be quantified by its "epoxy equivalent weight" The epoxy equivalent weight reflects the amount of resin that contains one molecule of an epoxy group, and it may be calculated by dividing the number average molecular weight of the modifier by the number of epoxy groups in the molecule. The polyepoxide modifier of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide modifier may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it can not only result in chain extension of the renewable polyester, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, butyl methacrylate, n-amyl methacrylate, n-hexyl methacrylate, 1-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide modifier is a terpolymer formed from an epoxy-functional (meth)acrylic monomeric component, α-olefin monomeric component, and non-epoxy functional (meth)acrylic monomeric component. For example, the polyepoxide modifier may be poly(ethylene-co-methylacrylate-co-glycidyl methacrylate), which has the following structure:

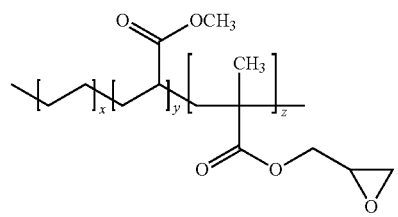

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164, which is incorporated herein in its entirety by reference thereto for all purposes. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the renewable polyester, but too high of a content may reduce the melt flow rate to such an extent that the polyepoxide modifier adversely impacts the melt strength of the polymer blend. Thus, in most embodiments, the epoxy-functional (meth) acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth) acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide modifier that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %.

In addition to controlling the type and relative content of the monomers used to form the polyepoxide modifier, the overall weight percentage may also be controlled to achieve the desired benefits. For example, if the modification level is too low, the desired increase in melt strength and mechanical properties may not be achieved. The present inventors have also discovered, however, that if the modification level is too high, the ability to form a film may be restricted due to strong molecular interactions (e.g., crosslinking) and physical network formation by the epoxy functional groups. Thus, the polyepoxide modifier is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the renewable polyesters employed in the composition. The polyepoxide modifier may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

When employed, the polyepoxide modifier may also influence the morphology of the thermoplastic composition in a way that further enhances its reactivity with the renewable polyester. More particularly, the resulting morphology may have a plurality of discrete domains of the polyepoxide modifier distributed throughout a continuous polyester matrix. These "secondary" domains may have a variety of different shapes, such as elliptical, spherical, cylindrical, etc. Regardless of the shape, however, the size of an individual secondary domain, after blending, is small to provide an increased surface area for reaction with the renewable polyester. For example, the size of a secondary domain (e.g., length) typically ranges from about 10 to about 1000 nanometers, in some embodiments from about 20 to about 800 nanometers, in some embodiments from about 40 to about 600 nanometers, and in some embodiments from about 50 to about 400 nanometers. As noted above, the toughening additive also forms discrete domains within the polyester matrix, which are considered in the "primary" domains of the composition. Of course, it should be also understood that domains may be formed by a combination of the polyepoxide, toughening additive, and/or other components of the blend.

In addition to polyepoxides, other reactive compatibilizers may also be employed in the present invention, such as oxazoline-functionalized polymers, cyanide-functionalized polymers, etc. When employed, such reactive compatibilizers may be employed within the concentrations noted above for the polyepoxide modifier. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

E. Other Components

One beneficial aspect of the present invention is that good mechanical properties (e.g., elongation) may be provided without the need for conventional plasticizers, such as solid or semi-solid polyethylene glycol, such as available from Dow Chemical under the name Carbowax™). The thermoplastic composition may be generally free of such plasticizers. Nevertheless, it should be understood that plasticizers may be used in certain embodiments of the present invention. When utilized, however, the plasticizers are typically present in an amount of less than about 10 wt. %, in some embodiments from about 0.1 wt. % to about 5 wt. %, and in some embodiments, from about 0.2 wt. % to about 2 wt. % of the thermoplastic composition. Of course, other ingredients may be utilized for a variety of different reasons. For instance, materials that may be used include, without limitation, catalysts, pigments, antioxidants, stabilizers, surfactants, waxes, solid solvents, fillers, nucleating agents (e.g., titanium dioxide, calcium carbonate, etc.), particulates, and other materials added to enhance the processability of the thermoplastic composition. When utilized, it is normally desired that the amounts of these additional ingredients are minimized to ensure optimum compatibility and cost-effectiveness. Thus, for example, it is normally desired that such ingredients constitute less than about 10 wt. %, in some embodiments less than about 8 wt. %, and in some embodiments, less than about 5 wt. % of the thermoplastic composition.

II. Blending

The raw materials (e.g., renewable polyester, toughening additive, and interphase modifier) may be blended using any of a variety of known techniques. In one embodiment, for example, the raw materials may be supplied separately or in combination. For instance, the raw materials may first be dry mixed together to form an essentially homogeneous dry mixture. The raw materials may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the raw materials may be fed to the same or different feeding ports of the twin-screw extruder and melt blended to form a substantially homogeneous melted mixture. If desired, other additives may also be injected into the polymer melt and/or separately fed into the extruder at a different point along its length. Alternatively, the additives may be pre-blended with the renewable polyester, toughening additive, and/or interphase modifier.

Regardless of the particular processing technique chosen, the raw materials are blended under sufficient shear/pressure and heat to ensure sufficient dispersion, but not so high as to adversely reduce the size of the discrete domains so that they are incapable of achieving the desired toughness and elongation. For example, blending typically occurs at a temperature of from about 180° C. to about 260° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 500 revolutions per minute ("rpm"), in some embodiments from about 70 to about 300 rpm, and in some embodiments, from about 100 to about 200 rpm. This may result in a temperature that is sufficient high to disperse the toughening additive and interphase modifier without adversely impacting the size of the resulting domains. The melt shear rate, and in turn the degree to which the polymers are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Film Construction

Any known technique may be used to form a film from the blended composition, including blowing, casting, flat die extruding, etc. In one particular embodiment, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. No. 3,354,506 to Raley; U.S. Pat. No. 3,650,649 to Schppers; and U.S. Pat. No. 3,801,429 to Schrenk et al., as well as U.S. Patent Application Publication Nos. 2005/0245162 to McCormack, et al. and 2003/0068951 to Boggs, et al. In yet another embodiment, however, the film is formed using a casting technique.

Referring to FIG. 1, for instance, one embodiment of a method for forming a cast film is shown. In this embodiment, the raw materials (not shown) are supplied to the extruder 80 and then cast onto a casting roll 90 to form a single-layered precursor film 10a. If a multilayered film is to be produced, the multiple layers are co-extruded together onto the casting roll 90. The casting roll 90 may optionally be provided with embossing elements to impart a pattern to the film. Typically, the casting roll 90 is kept at temperature sufficient to solidify and quench the sheet 10a as it is formed, such as from about 20 to 60° C. If desired, a vacuum box may be positioned adjacent to the casting roll 90 to help keep the precursor film 10a close to the surface of the roll 90. Additionally, air knives or electrostatic pinners may help force the precursor film 10a against the surface of the casting roll 90 as it moves around a spinning roll. An air knife is a device known in the art that focuses a stream of air at a very high flow rate to pin the edges of the film.

Once cast, the film 10a may then be optionally oriented in one or more directions to further improve film uniformity and reduce thickness. The film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" oriented film may then be laminated to a fibrous web. In addition, the uniaxially oriented film may also be oriented in the cross-machine direction to form a "biaxially oriented" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

Referring again to FIG. 1, for instance, one method for forming a uniaxially oriented film is shown. As illustrated, the precursor film 10a is directed to a film-orientation unit 100 or machine direction orienter ("MDO"), such as commercially available from Marshall and Williams, Co. of Providence, R.I. The MDO has a plurality of stretching rolls (such as from 5 to 8) which progressively stretch and thin the film in the machine direction, which is the direction of travel of the film through the process as shown in FIG. 1. While the MDO 100 is illustrated with eight rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the film 10a above room temperature (e.g., to 125° F.). The progressively faster speeds of adjacent rolls in the MDO act to stretch the film 10a. The rate at which the stretch rolls rotate determines the amount of stretch in the film and final film weight.

The resulting film 10b may then be wound and stored on a take-up roll 60. While not shown here, various additional potential processing and/or finishing steps known in the art, such as slitting, treating, aperturing, printing graphics, or lamination of the film with other layers (e.g., nonwoven web materials), may be performed without departing from the spirit and scope of the invention.

The film of the present invention may be mono- or multi-layered. Multilayer films may be prepared by co-extrusion of the layers, extrusion coating, or by any conventional layering process. For example, the film may contain from two (2) to fifteen (15) layers, and in some embodiments, from three (3) to twelve (12) layers. Such multilayer films normally contain at least one base layer and at least one additional layer (e.g., skin layer), but may contain any number of layers desired. For example, the multilayer film may be formed from a base layer and one or more skin layers, wherein the base layer is formed from the thermoplastic composition of the present invention. In most embodiments, the skin layer(s) are formed from a thermoplastic composition such as described above. It should be understood, however, that other polymers may also be employed in the skin layer(s), such as polyolefin polymers (e.g., linear low-density polyethylene (LLDPE) or polypropylene).

The thickness of the film of the present invention may be relatively small to increase flexibility. For example, the film may have a thickness of from about 1 to about 200 micrometers, in some embodiments from about 2 to about 150 micrometers, in some embodiments from about 5 to about 100 micrometers, and in some embodiments, from about 10 to about 60 micrometers. Despite having such a small thickness, the film of the present invention is nevertheless able to retain good mechanical properties during use. For example, the film is relatively ductile. One parameter that is indicative of the ductility of the film is the percent elongation of the film at its break point, as determined by the stress strain curve, such as obtained in accordance with ASTM Standard D638-10 at 23° C. For example, the percent elongation at break of the film in the machine direction ("MD") may be about 10% or more, in some embodiments about 50% or more, in some embodiments about 80% or more, and in some embodiments, from about 100% to about 600%. Likewise, the percent elongation at break of the film in the cross-machine direction ("CD") may be about 15% or more, in some embodiments about 40% or more, in some embodiments about 70% or more, and in some embodiments, from about 100% to about 400%. Another parameter that is indicative of ductility is the tensile modulus of the film, which is equal to the ratio of the tensile stress to the tensile strain and is determined from the slope of a stress-strain curve. For example, the film typically exhibits a MD and/or CD tensile modulus of about 2500 Megapascals ("MPa") or less, in some embodiments about 2200 MPa or less, in some embodiments from about 50 MPa to about 2000 MPa, and in some embodiments, from about 100 MPa to about 1000 MPa. The tensile modulus may be determined in accordance with ASTM D638-10 at 23° C.

Although the film is ductile, it can still be relatively strong. One parameter that is indicative of the relative strength of the film is the ultimate tensile strength, which is equal to the peak stress obtained in a stress-strain curve, such as obtained in accordance with ASTM Standard D638-10. For example, the film of the present invention may exhibit an MD and/or CD peak stress of from about 5 to about 65 MPa, in some embodiments from about 10 MPa to about 60 MPa, and in some embodiments, from about 20 MPa to about 55 MPa. The film may also exhibit an MD and/or CD break stress of from about 5 MPa to about 60 MPa, in some embodiments from about 10 MPa to about 50 MPa, and in some embodiments, from about 20 MPa to about 45 MPa. The peak stress and break stress may be determined in accordance with ASTM D638-10 at 23° C.

If desired, the film of the present invention may be subjected to one or more additional processing steps. Examples of such processes include, for instance, groove roll stretching, perforating, embossing, coating, etc. The film may also be surface treated using any of a variety of known techniques to improve its properties. For example, high energy beams (e.g., plasma, x-rays, e-beam, etc.) may be used to remove or reduce any skin layers that form on the film, to change the surface polarity, porosity, topography, etc.

The film may also be laminated to one or more nonwoven web facings to reduce the coefficient of friction and enhance the cloth-like feel of the composite surface. Exemplary polymers for use in forming nonwoven web facings may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, renewable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the nonwoven web facing. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Multicomponent fibers having various irregular shapes may also be formed.

Fibers of any desired length may be employed, such as staple fibers, continuous fibers, etc. In one particular embodiment, for example, staple fibers may be used that have a fiber length in the range of from about 1 to about 150 millimeters, in some embodiments from about 5 to about 50 millimeters, in some embodiments from about 10 to about 40 millimeters, and in some embodiments, from about 10 to about 25 millimeters. Although not required, carding techniques may be employed to form fibrous layers with staple fibers as is well known in the art. For example, fibers may be formed into a carded web by placing bales of the fibers into a picker that separates the fibers. Next, the fibers are sent through a combing or carding unit that further breaks apart and aligns the fibers in the machine direction so as to form a machine direction-oriented fibrous nonwoven web. The carded web may then be bonded using known techniques to form a bonded carded nonwoven web.

If desired, the nonwoven web facing used to form the nonwoven composite may have a multi-layer structure. Suitable multi-layered materials may include, for instance, spunbond/meltblown/spunbond (SMS) laminates and spunbond/meltblown (SM) laminates. Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above. A nonwoven web facing may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven web. The fibrous component of the composite may contain any desired amount of the resulting substrate.

The basis weight of the nonwoven web facing may generally vary, such as from about 5 grams per square meter ("gsm") to 120 gsm, in some embodiments from about 8 gsm to about 70 gsm, and in some embodiments, from about 10 gsm to about 35 gsm. When using multiple nonwoven web facings, such materials may have the same or different basis weights.

IV. Applications

The film of the present invention may be used in a wide variety of applications, such as a packaging film, such as an individual wrap, packaging pouch, or bag for the disposal of a variety of articles, such as food products, paper products (e.g., tissue, wipes, paper towels, etc.), absorbent articles, etc. Various suitable pouch, wrap, or bag configurations for absorbent articles are disclosed, for instance, in U.S. Pat. No. 6,716,203 to Sorebo, et al. and U.S. Pat. No. 6,380,445 to Moder, et al., as well as U.S. Patent Application Publication No. 2003/0116462 to Sorebo, et al.

The film may also be employed in other applications. For example, the film may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins, pantiliners, etc.), swim wear, baby wipes, and so forth; medical absorbent articles, such as garments, fenestration materials, underpads, bedpads, bandages, absorbent drapes, and medical wipes; food service wipers; clothing articles; and so forth. Several examples of such absorbent articles are described in U.S. Pat. No. 5,649,916 to DiPalma, et al.; U.S. Pat. No. 6,110,158 to Kielpikowski; U.S. Pat. No. 6,663,611 to Blaney, et al. Still other suitable articles are described in U.S. Patent Application Publication No. 2004/0060112 A1 to Fell et al., as well as U.S. Pat. No. 4,886,512 to Damico et al.; U.S. Pat. No. 5,558,659 to Sherrod et al.; U.S. Pat. No. 6,888,044 to Fell et al.; and U.S. Pat. No. 6,511,465 to Freiburger et al. Materials and processes suitable for forming such absorbent articles are well known to those skilled in the art.

In this regard, one particular embodiment of an absorbent article that may employ the film of the present invention will now be described in more detail. For instance, the absorbent article may include a main body portion containing a topsheet, an outer cover or backsheet, an absorbent core positioned between the backsheet and the topsheet, and a pair of flaps extending from each longitudinal side of the main body portion. The topsheet defines a bodyfacing surface of the absorbent article. The absorbent core is positioned inward from the outer periphery of the absorbent article and includes a body-facing side positioned adjacent the topsheet and a garment-facing surface positioned adjacent the backsheet. In one particular embodiment of the present invention, the backsheet is a film formed from the thermoplastic composition of the present invention and is generally liquid-impermeable and optionally vapor-permeable. The film used to form the backsheet may also be laminated to one or more nonwoven web facings such as described above.

The topsheet is generally designed to contact the body of the user and is liquid-permeable. The topsheet may surround the absorbent core so that it completely encases the absorbent article. Alternatively, the topsheet and the backsheet may extend beyond the absorbent core and be peripherally joined together, either entirely or partially, using known techniques. Typically, the topsheet and the backsheet are joined by adhesive bonding, ultrasonic bonding, or any other suitable joining method known in the art. The topsheet is sanitary, clean in appearance, and somewhat opaque to hide bodily discharges collected in and absorbed by the absorbent core. The topsheet further exhibits good strike-through and rewet characteristics permitting bodily discharges to rapidly penetrate through the topsheet to the absorbent core, but not allow the body fluid to flow back through the topsheet to the skin of the wearer. For example, some suitable materials that may be used for the topsheet include nonwoven materials, perforated thermoplastic films, or combinations thereof. A nonwoven fabric made from polyester, polyethylene, polypropylene, bicomponent, nylon, rayon, or like fibers may be utilized. For instance, a white uniform spunbond material is particularly desirable because the color exhibits good masking properties to hide menses that has passed through it, U.S. Pat. No. 4,801,494 to Datta, et al. and U.S. Pat. No. 4,908,026 to Sukiennik, et al. teach various other cover materials that may be used in the present invention.

The topsheet may also contain a plurality of apertures formed therethrough to permit body fluid to pass more readily into the absorbent core. The apertures may be randomly or uniformly arranged throughout the topsheet, or they may be located only in the narrow longitudinal band or strip arranged along the longitudinal axis of the absorbent article. The apertures permit rapid penetration of body fluid down into the absorbent core. The size, shape, diameter and number of apertures may be varied to suit one's particular needs.

The absorbent article may also contain an absorbent core positioned between the topsheet and the backsheet. The absorbent core may be formed from a single absorbent member or a composite containing separate and distinct absorbent members. It should be understood, however, that any number of absorbent members may be utilized in the present invention. For example, in an embodiment, the absorbent core may contain an intake member positioned between the topsheet and a transfer delay member. The intake member may be made of a material that is capable of rapidly transferring, in the z-direction, body fluid that is delivered to the topsheet. The intake member may generally have any shape and/or size desired. In one embodiment, the intake member has a rectangular shape, with a length equal to or less than the overall length of the absorbent article, and a width less than the width of the absorbent article. For example, a length of between about 150 mm to about 300 mm and a width of between about 10 mm to about 60 mm may be utilized.

Any of a variety of different materials may be used for the intake member to accomplish the above-mentioned functions. The material may be synthetic, cellulosic, or a combination of synthetic and cellulosic materials. For example, airlaid cellulosic tissues may be suitable for use in the intake member. The airlaid cellulosic tissue may have a basis weight ranging from about 10 grams per square meter (gsm) to about 300 gsm, and in some embodiments, between about 100 gsm to about 250 gsm. In one embodiment, the airlaid cellulosic tissue has a basis weight of about 200 gsm. The airlaid tissue may be formed from hardwood and/or softwood fibers. The airlaid tissue has a fine pore structure and provides an excellent wicking capacity, especially for menses.

If desired, a transfer delay member may be positioned vertically below the intake member. The transfer delay member may contain a material that is less hydrophilic than the other absorbent members, and may generally be characterized as being substantially hydrophobic. For example, the transfer delay member may be a nonwoven fibrous web composed of a relatively hydrophobic material, such as polypropylene, polyethylene, polyester or the like, and also may be composed of a blend of such materials. One example of a material suitable for the transfer delay member is a spunbond web composed of polypropylene, multi-lobal fibers. Further examples of suitable transfer delay member materials include spunbond webs composed of polypropylene fibers, which may be round, tri-lobal or poly-lobal in cross-sectional shape and which may be hollow or solid in structure. Typically the webs are bonded, such as by thermal bonding, over about 3% to about 30% of the web area. Other examples of suitable materials that may be used for the transfer delay member are described in U.S. Pat. No. 4,798,603 to Meyer, et al., and U.S. Pat. No. 5,248,309 to Serbiak, et al. To adjust the performance of the invention, the transfer delay member may also be treated with a selected amount of surfactant to increase its initial wettability.

The transfer delay member may generally have any size, such as a length of about 150 mm to about 300 mm. Typically, the length of the transfer delay member is approximately equal to the length of the absorbent article. The transfer delay member may also be equal in width to the intake member, but is typically wider. For example, the width of the transfer delay member may be from between about 50 mm to about 75 mm, and particularly about 48 mm.

The transfer delay member typically has a basis weight less than that of the other absorbent members. For example, the basis weight of the transfer delay member is typically less than about 150 grams per square meter (gsm), and in some embodiments, between about 10 gsm to about 100 gsm. In one particular embodiment, the transfer delay member is formed from a spunbonded web having a basis weight of about 30 gsm.

Besides the above-mentioned members, the absorbent core may also include a composite absorbent member, such as a coform material. In this instance, fluids may be wicked from the transfer delay member into the composite absorbent member. The composite absorbent member may be formed separately from the intake member and/or transfer delay member, or may be formed simultaneously therewith. In one embodiment, for example, the composite absorbent member may be formed on the transfer delay member or intake member, which acts a carrier during the coform process described above.

Although various configurations of an absorbent article have been described above, it should be understood that other configurations are also included within the scope of the present invention. Further, the present invention is by no means limited to backsheets and the film of the present invention may be incorporated into a variety of different components of an absorbent article. For example, a release liner of an absorbent article may include the film of the present invention.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools are used. The samples are placed into an aluminum pan and weighed to an accuracy of 0.01 milligram on an analytical balance. A lid is crimped over the material sample onto the pan. Typically, the resin pellets are placed directly in the weighing pan.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. All testing is run with a 55-cubic centimeter per minute nitrogen (industrial grade) purge on the test chamber.

The results are evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature is identified as the region on the plot-line where a distinct change in slope occurred, and the melting temperature is determined using an automatic inflection calculation.

Tensile Properties

Films were tested for tensile properties (peak stress, modulus, strain at break, and energy per volume at break) on a MTS Synergie 200 tensile frame. The test was performed in accordance with ASTM D638-10 (at about 23° C.). Film samples were cut into dog bone shapes with a center width of 3.0 mm before testing. The dog-bone film samples were held in place using grips on the MTS Synergie 200 device with a gauge length of 18.0 mm. The film samples were stretched at a crosshead speed of 5.0 in/min until breakage occurred. Five samples were tested for each film in both the machine direction (MD) and the cross direction (CD). A computer program called TestWorks 4 was used to collect data during testing and to generate a stress versus strain curve from which a number of properties were determined, including modulus, peak stress, elongation, and energy to break.

Moisture Content

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§ X2.1.2) may be 130° C., the sample size (§ X2.1.1) may be 2 to 4 grams, and the vial purge time (§ X2.1.4) may be 30 seconds. Further, the ending criteria (§ X2.1.3) may be defined as a "prediction" mode, which means that the test is ended when the built-in programmed criteria (which mathematically calculates the end point moisture content) is satisfied.

Example 1

Films formed from 100% polylactic acid (PLA) were formed as a control by extruding PLA 6201D (Natureworks®, melt flow rate of 10 g/10 minutes at 190° C.) into a film. The pellets were flood fed into a Rheomix 252 signal screw extruder with a L/D ratio of 25:1 that was heated to a temperature of about 208° C. where the molten blend exited through 6 inch width cast film die and drawn via a Haake take-up roller to a film thickness ranging from 41.9 µm to 48.3 µm.

Example 2

The ability to form films from a blend of 88.7 wt. % polylactic acid (PLA 6201D, Natureworks®) 9.9 wt. % of a toughening additive and 1.4% polyepoxide modifier was demonstrated. The toughening additive was Vistamaxx™ 2120 (ExxonMobil), which is a polyolefin copolymer/elastomer with a melt flow rate of 29 g/10 min (190° C., 2160 g) and a density of 0.866 g/cm³. The polyepoxide modifier was polyethylene-co-methyl acrylate-co-glycidyl methacrylate) (Lotader® AX8950, Arkema) having a melt flow rate of 70 to 100 g/10 min (190° C./2160 g), a glycidyl methacrylate content of 7 to 11 wt. %, methyl acrylate content of 13 to 17 wt. %, and ethylene content of 72 to 80 wt. %. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood feed into a Rheomix 252 signal screw extruder with a L/D ratio of 25:1 that was heated to a temperature of about 212° C. where the molten blend exited through a Haake 6 inch width cast film die and drawn to a film thickness ranging from 39.4 µm to 50.8 µm via Haake take-up roller.

Example 3

Figure 2:
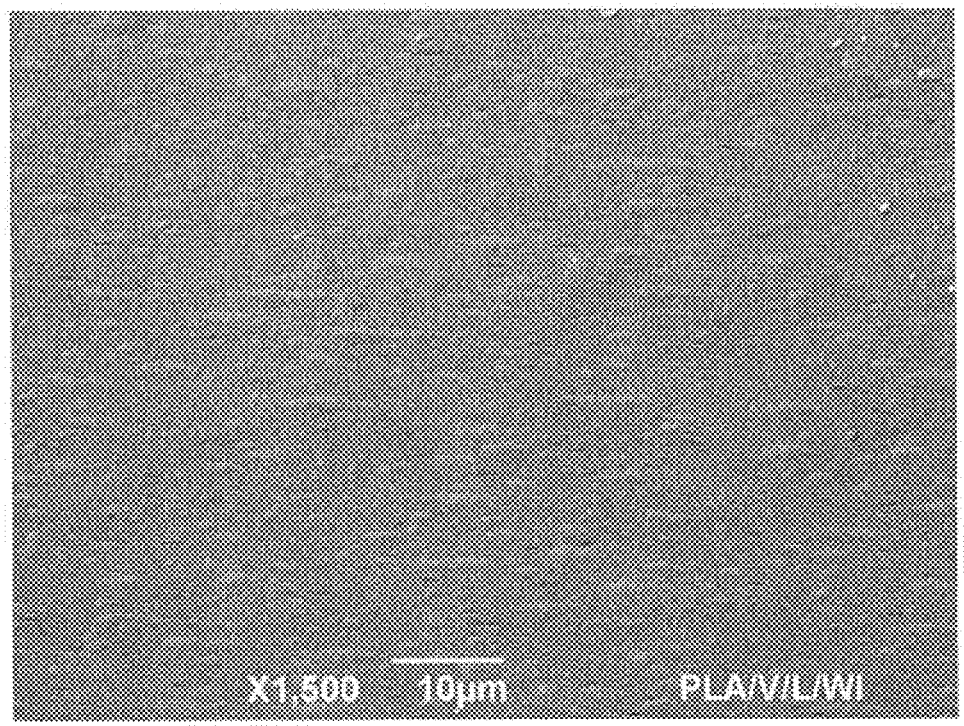
FIG. 2 is an SEM photomicrograph of a sample of Example 3 before the application of an external force.
Figure 3:
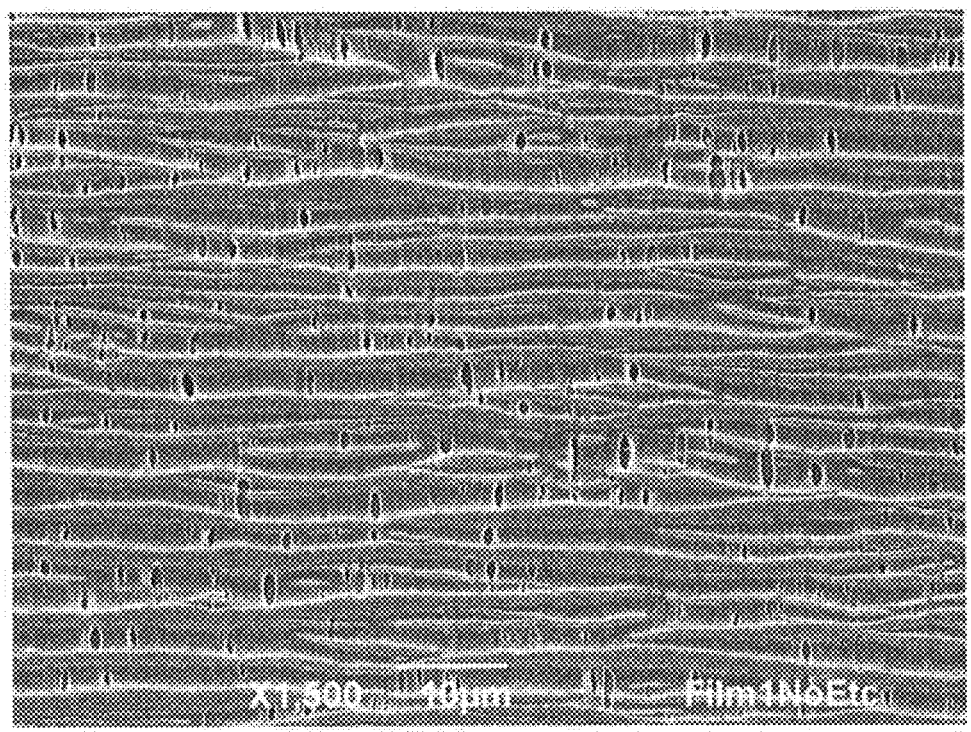
FIG. 3 is an SEM photomicrograph of a sample of Example 3 after the application of an external force.

Films were formed as described in Example 2, except that the blend contained 85.3 wt. % polylactic acid (PLA 6201D, Natureworks®), 9.5 wt. % of toughening additive Vistamaxx™ 2120 (ExxonMobil), 1.4 wt. % polyepoxide modifier (Lotader® AX8950, Arkema), and 3.8 wt. % internal interfacial modifier (PLURIOL® WI 285 Lubricant Basestock from BASF). The PLURIOL® WI285 was added via injector pump into barrel zone #2. Films were drawn to a thickness ranging from 38.1 µm to 45.7 µm. SEM photomicrographs were taken of Example 3 before and after testing. The results are shown in FIGS. 2-3. As shown, the PLA matrix of Example 3 underwent debonding, which resulted in the formation of a plurality of voids adjacent to discrete domains of the Vistamaxx™ polymer.

Example 4

Films were formed as described in Example 3, except that they were drawn to a thickness of 110.5 µm to 171.5 µm.

Various mechanical properties were tested for the films of Examples 1-4 as described above. The results are set forth below in Table 1.

TABLE 1

Film Properties for Example 1-4

| Ex. | | Avg. Thickness (μm) | Avg. Modulus (MPa) | Avg. Yield Stress (MPa) | Avg. Break Stress (MPa) | Avg. Strain at Break (%) | Avg. Energy per Vol. (J/cm³) |
|---|---|---|---|---|---|---|---|
| 1 | MD | 44.2 | 2535 | 69.5 | 60.4 | 6.3 | 3.3 |
|   | CD | 46.2 | 2458 | 64.7 | 50.9 | 10.1 | 5.1 |
| 2 | MD | 45.5 | 2078 | 53.8 | 41.6 | 54.6 | 19.4 |
|   | CD | 42.4 | 1765 | 40.5 | 35.9 | 125.3 | 42.0 |
| 3 | MD | 41.9 | 1963 | 49.0 | 37.0 | 252.0 | 80.7 |
|   | CD | 40.6 | 1682 | 34.6 | 34.1 | 192.0 | 60.0 |
| 4 | MD | 137.2 | 1892 | 46.5 | 41.5 | 299.8 | 91.3 |
|   | CD | 134.6 | 1603 | 34.2 | 33.0 | 227.7 | 67.6 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A film comprising a thermoplastic composition, wherein the thermoplastic composition comprises:
    at least one rigid polyester having a glass transition temperature of from 30° C. to 100° C., wherein the polyester constitutes about 80 wt. % or more of the thermoplastic composition;
    from about 1 wt. % to about 20 wt. % of at least one polymeric toughening additive based on the weight of the polyester, wherein the polymeric toughening additive includes a polyolefin;
    from about 0.1 wt. % to about 20 wt. % of at least one interphase modifier based on the weight of the polyester, wherein the interphase modifier comprises a silicone, a silicone-polyether copolymer, an alkylene glycol, an alkane diol, an amine oxide, a fatty acid ester, or a combination thereof; and
    from about 0.5 wt. % to about 20 wt. % of at least one compatibilizer, based on the weight of the composition; and
    wherein the thermoplastic composition has a morphology in which a plurality of discrete primary domains are dispersed within a continuous phase, the domains containing the polymeric toughening additive and the continuous phase containing the polyester; and
    wherein a plurality of voids are distributed throughout the composition and wherein the voids are adjacent the discrete domains and further wherein the voids are formed from debonding between the polyester and the discrete primary domains.

2. The film of claim 1, wherein the polyester is polylactic acid, polyethylene terephthalate, or a combination thereof.

3. The film of claim 1, wherein the polyester and the thermoplastic composition have a glass transition temperature of from about 50° C. to about 75° C.

4. The film of claim 1, wherein the ratio of the solubility parameter for the polyester to the solubility parameter of the polymeric toughening additive is from about 0.5 to about 1.5, the ratio of the melt flow rate for the polyester to the melt flow rate of the polymeric toughening additive is from about 0.2 to about 8, and the ratio of the Young's modulus elasticity of the polyester to the Young's modulus of elasticity of the polymeric toughening additive is from about 2 to about 500.

5. The film of claim 1, wherein the polyolefin is a propylene homopolymer, propylene/α-olefin copolymer, ethylene/α-olefin copolymer, or a combination thereof.

6. The film of claim 1, wherein the interphase modifier has a kinematic viscosity of from about 0.7 to about 200 centistokes, determined at a temperature of 40° C.

7. The film of claim 1, wherein the interphase modifier is hydrophobic.

8. The film of claim 1, wherein the interphase modifier is an alkylene glycol, an alkane diol, a fatty acid ester, or a combination thereof.

9. The film of claim 1, wherein the discrete domains have a length of from about 0.05 micrometers to about 30 micrometers.

10. The film of claim 1, wherein the compatibilizer comprises a polyepoxide modifier.

11. The film of claim 10, wherein the polyepoxide modifier includes an epoxy-functional (meth)acrylic monomeric component.

12. The film of claim 11, wherein the polyepoxide modifier is poly(ethylene-co-methacrylate-co-glycidyl methacrylate).

13. The film of claim 1, wherein the film exhibits a tensile modulus in the machine direction and cross-machine direction of from about 50 to about 2000 Megapascals, determined at 23° C. according to ASTM D638-10.

14. The film of claim 1, wherein the film exhibits a tensile elongation at break in the machine direction of from about 100% to about 600% and a tensile elongation at break in the cross-machine direction of from about 100% to about 400%, determined at 23° C. according to ASTM D638-10.

15. The film of claim 1, wherein the film has a thickness of from about 1 to about 200 micrometers.

16. The film of claim 1, wherein the film is a multi-layered film that contains a base layer and at least one additional layer, wherein the base layer contains the thermoplastic composition.

17. The film of claim 1, wherein the film exhibits a tensile modulus in the machine direction and cross-machine direction of about 2500 Megapascals or less, a tensile elongation at break in the machine direction of about 10% or more, and a tensile elongation at break in the cross-machine direction of about 15% or more, wherein the tensile modulus and tensile elongation at break are determined at 23° C. according to ASTM D638-10.

18. A film that has a thickness of from about 1 to about 200 micrometers and comprises a thermoplastic composition, wherein the thermoplastic composition comprises
    about 80 wt. % or more of at least one polylactic acid or polyethylene terephthalate having a glass transition temperature of about 30° C. or more wherein the at least one polylactic acid or polyethylene terephthalate define a continuous phase,
    from about 0.1 wt. % to about 20 wt. % of at least one polymeric toughening additive wherein the polymeric toughening additive includes a polyolefin and wherein the polymeric toughening additive is in the form of a discrete domain dispersed within the continuous phase,
    from about 0.1 wt. % to about 20 wt. % of at least one interphase modifier comprising a silicone, a silicone-polyether copolymer, an alkylene glycol, an alkane diol, an amine oxide, a fatty acid ester, or a combination thereof, and from about 0.5 wt. % to about 20 wt. % of at least one compatibilizer,
wherein a plurality of voids are distributed throughout the composition and wherein the voids are adjacent the discrete domains and further wherein the voids are formed from debonding between the polyester and the discrete primary domains.

19. The film of claim 18, wherein the polymeric toughening additive includes a propylene homopolymer, propylene/α-olefin copolymer, ethylene/α-olefin copolymer, or a combination thereof.

20. The film of claim 18, wherein the ratio of the glass transition temperature of the thermoplastic composition to the glass transition temperature of the polylactic acid is from about 0.9 to about 1.1.

21. The film of claim 18, wherein the interphase modifier is an alkylene glycol, an alkane diol, a fatty acid ester, or a combination thereof.

22. The film of claim 18, wherein the compatibilizer comprises a polyepoxide modifier.

23. The film of claim 18, wherein the film exhibits a tensile modulus in the machine direction and cross-machine direction of about 2500 Megapascals or less, a tensile elongation at break in the machine direction of about 10% or more, and a tensile elongation at break in the cross-machine direction of about 15% or more, wherein the tensile modulus and tensile elongation at break are determined at 23° C. according to ASTM D638-10.

24. The film of claim 18, wherein the film exhibits a tensile modulus in the machine direction and cross-machine direction of from about 50 to about 2000 Megapascals, determined at 23° C. according to ASTM D638-10.

25. The film of claim 18, wherein the film exhibits a tensile elongation at break in the machine direction of from about 100% to about 600% and a tensile elongation at break in the cross-machine direction of from about 100% to about 400%, determined at 23° C. according to ASTM D638-10.

26. An absorbent article comprising a generally liquid-impermeable layer, the layer comprising a film that comprising a thermoplastic composition, wherein the thermoplastic composition comprises:

about 80 wt. % more of at least one rigid polyester having a glass transition temperature of from 30° C. to 100° C.;
from about 1 wt. % to about 20 wt. % of at least one polymeric toughening additive based on the weight of the polyester, wherein the polymeric toughening additive includes a polyolefin;
from about 0.1 wt. % to about 20 wt. % of at least one interphase modifier based on the weight of the polyester, wherein the interphase modifier comprises a silicone, a silicone-polyether copolymer, an alkylene glycol, an alkane diol, an amine oxide, a fatty acid ester, or a combination thereof;
wherein the thermoplastic composition has a morphology in which a plurality of discrete primary domains are dispersed within a continuous phase, the domains containing the polymeric toughening additive and the continuous phase containing the polyester; and
from about 0.5 wt. % to about 20 wt. % of at least one compatibilizer, based on the weight of the composition,
wherein a plurality of voids are distributed throughout the composition and wherein the voids are adjacent the discrete domains and further wherein the voids are formed from debonding between the polyester and the discrete primary domains.

27. The absorbent article of claim 26, further comprising an absorbent core positioned between the generally liquid-impermeable layer and a liquid-permeable layer.

28. The absorbent article of claim 26, wherein the microporous film is joined to a nonwoven web material.

29. The absorbent article of claim 26, wherein the film exhibits a tensile modulus in the machine direction and cross-machine direction of about 2500 Megapascals or less, a tensile elongation at break in the machine direction of about 10% or more, and a tensile elongation at break in the cross-machine direction of about 15% or more, wherein the tensile modulus and tensile elongation at break are determined at 23° C. according to ASTM D638-10.

30. The film of claim 1, wherein the ratio of the glass transition temperature of the thermoplastic composition to the glass transition temperature of the polyester is from about 0.7 to about 1.3.

* * * * *